(12) United States Patent
Morishita et al.

(10) Patent No.: US 7,246,202 B2
(45) Date of Patent: Jul. 17, 2007

(54) CACHE CONTROLLER, CACHE CONTROL METHOD, AND COMPUTER SYSTEM

(75) Inventors: Hiroyuki Morishita, Hirakata (JP); Tokuzo Kiyohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 378 days.

(21) Appl. No.: 10/705,413

(22) Filed: Nov. 10, 2003

(65) Prior Publication Data

US 2004/0148466 A1 Jul. 29, 2004

(30) Foreign Application Priority Data

Nov. 11, 2002 (JP) ............................. 2002-327429

(51) Int. Cl.
*G06F 12/02* (2006.01)
(52) U.S. Cl. .................... 711/129; 711/3; 711/128; 711/168; 711/173
(58) Field of Classification Search ............... 711/3, 711/163, 202, 211, 128, 168, 129, 173
See application file for complete search history.

(56) References Cited

U.S. PATENT DOCUMENTS

| | | | | |
|---|---|---|---|---|
| 4,926,317 A | * | 5/1990 | Wallach et al. | 711/3 |
| 5,347,643 A | * | 9/1994 | Kondo et al. | 711/211 |
| 5,983,329 A | * | 11/1999 | Thaler et al. | 711/163 |
| 6,370,622 B1 | * | 4/2002 | Chiou et al. | 711/146 |
| 6,745,292 B1 | * | 6/2004 | Stevens | 711/129 |
| 2002/0087824 A1 | * | 7/2002 | Hum et al. | 711/202 |

OTHER PUBLICATIONS

Patterson, David A., John L. Hennessy. "Computer Organization and Design: The Hardware/Software Interface." 2nd ed. Morgan Kaufmann. San Francisco, CA: 1997.*
Handy, Jim. "The Cache Memory Book." 2nd ed. Academic Press LTD. London, UK: 1998.*
Marty, Emmanuel. "Review of Operating Systems." Apr. 23, 2000. <http://www2.tunes.org/Review/OSes.html>.*
"Cache." Wikipedia: The Free Encyclopedia. Jan. 29, 2006. <http://en.wikipedia/org/wiki/Cache>.*
Chioiu, Derek et al. "Application-Specific Memory Management in Embedded Systems Using Software-Controlled Caches." Proceedings of the 37th Design Automation Conference Architecture , Jun. 2000.Cambridge, Department of EECS, MIT, 2000.*
Suh, G Edward et al. "Dynamic Cache Partitioning for Simultaneous Multithreading Systems." 13th IASTED International Conference on Parallel and Distributed Computing Systems, 2001. Cambridge, MIT Laboratory for Computer Science, 2000.*

* cited by examiner

*Primary Examiner*—Matthew Kim
*Assistant Examiner*—Hetul Patel

(57) ABSTRACT

In a computer system that concurrently executes a plurality of tasks, a cache controller eliminates the possibility of the hit rate of one task dropping due to execution of another task. A region managing unit manages a plurality of regions in a cache memory in correspondence with a plurality of tasks. An address receiving unit receives, from a microprocessor, an address of a location in a main memory at which data to be accessed to execute one of the plurality of tasks is stored. A caching unit acquires, if the data to be accessed is not stored in the cache memory, a data block including the data from the main memory, and stores the acquired data block into a region in the cache memory corresponding to the task.

14 Claims, 7 Drawing Sheets

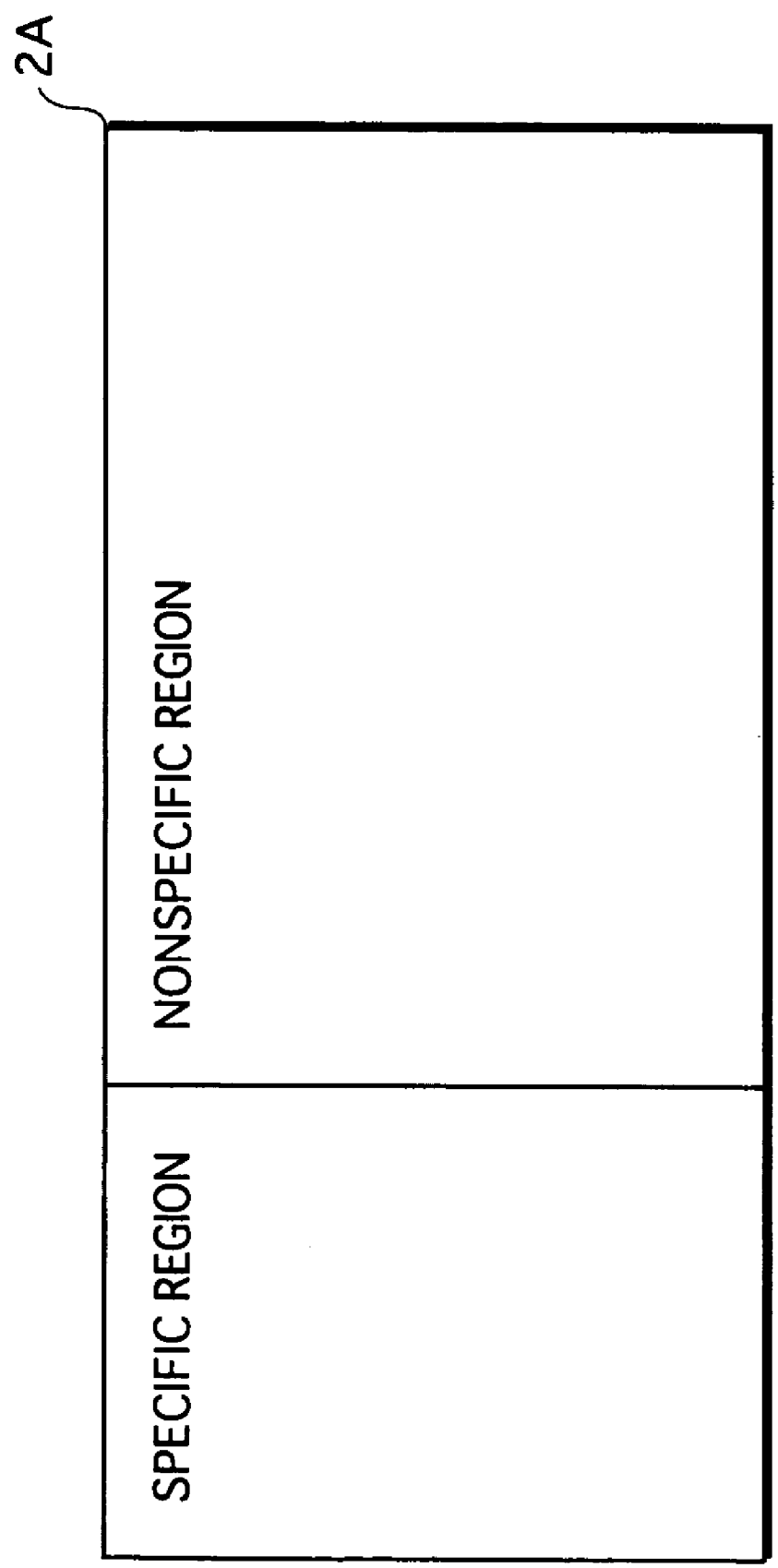

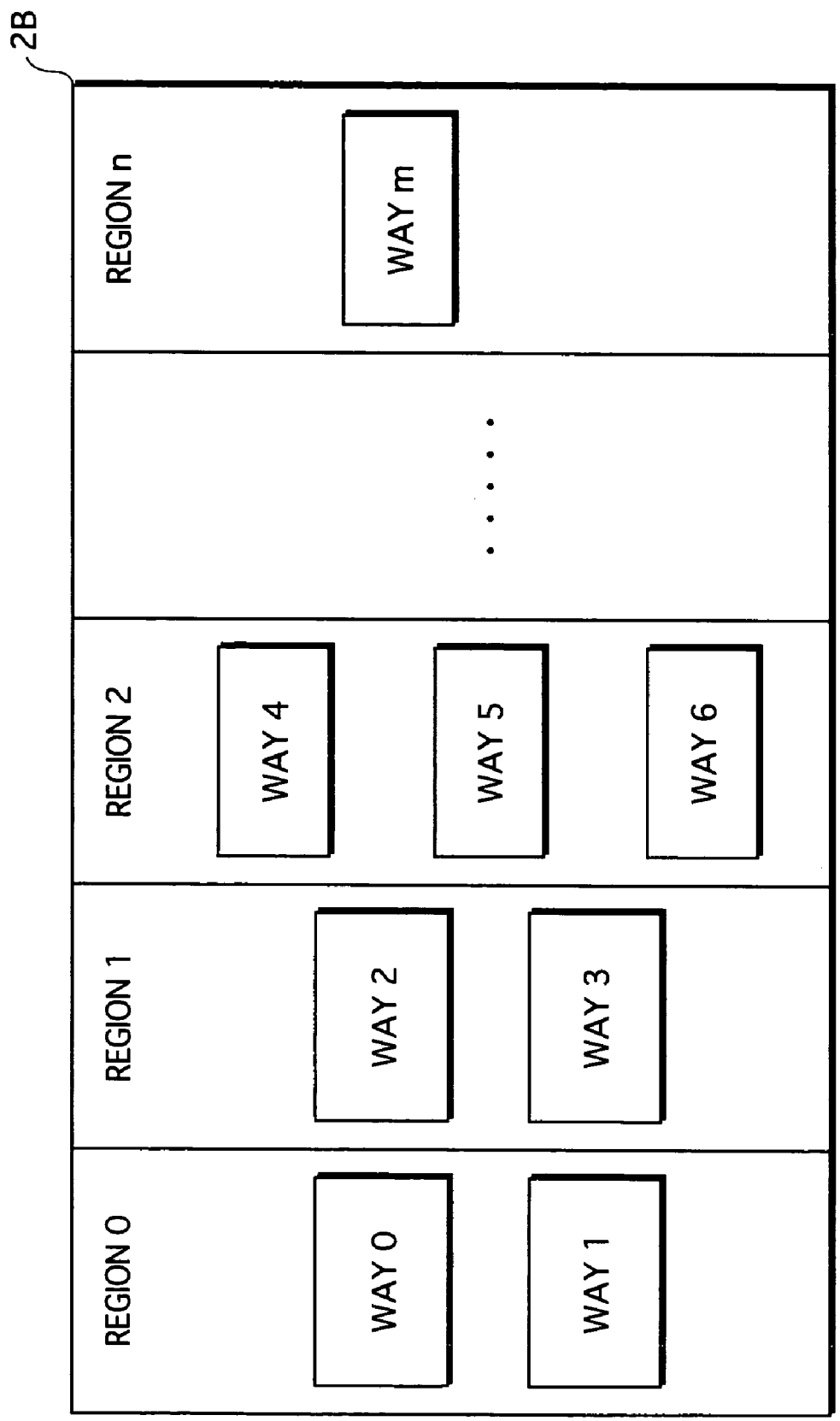

CACHE CONTROLLER, CACHE CONTROL METHOD, AND COMPUTER SYSTEM

This application is based on an application No. 2002-327429 filed in Japan, the contents of which are hereby incorporated by reference.

BACKGROUND OF THE INVENTION

1. Field of the Invention

The present invention relates to a cache controller and a cache control method for controlling a cache memory.

2. Prior Art

Major computer systems today employ a memory hierarchy. In the memory hierarchy, a storage device which has a high access speed but is expensive and a storage device which has a low access speed but is less costly are used in combination, to realize a high-speed, large-capacity storage system at low cost.

In general-purpose personal computers, for example, storage devices such as registers in a microprocessor, a cache memory, a main memory, and a hard disk are organized in a hierarchy.

The cache memory has a higher access speed than the main memory. Accesses, such as reads and writes, to the cache memory are controlled by a cache controller. If data requested by the microprocessor is not found in the cache memory, the cache controller reads a set of data including the requested data stored at consecutive addresses from the main memory, and stores the set of data to the cache memory.

Such a data transfer from the main memory to the cache memory is called caching. The unit of data that can be cached is a line (or a block), which is also the unit of data that can be stored in the cache memory.

Also, a failure to find the requested data in the cache memory is called a cache miss.

When the cache miss occurs, the cache controller caches the set of data including the requested data from the main memory in units of lines. During this time, the microprocessor is placed in a wait state.

On the other hand, if the requested data is found in the cache memory, it is called a cache hit. A ratio of cache hits to all accesses to the cache memory is called a hit rate.

Access patterns of programs executed by the microprocessor have two properties: spatial locality and temporal locality. Spatial locality means if one address in the main memory is accessed then nearby addresses are also likely to be accessed soon afterward. Temporal locality means if one address in the main memory is accessed once then the same address is likely to be accessed again soon afterward. Accordingly, there is a high probability that the set of data cached in units of lines in response to the cache miss may be accessed soon.

The cached set of data is stored in a designated region of the cache memory in units of lines, according to a predetermined cache control method (mapping method).

Full associative mapping, direct mapping, and set associative mapping are three main cache control methods. These methods are described in detail in T. Saito & K. Omori *Contemporary Computer Architecture Principles* Ohmsha, Apr. 10, 1994, p. 112.

Full associative mapping can store data in any available location in the cache memory, and has the highest cache utilization efficiency. This method, however, needs a large number of comparators and so is not commonly used.

Suppose direct mapping or set associative mapping is used for caching in a computer system that concurrently executes tasks A and B in time-sharing. In this case, set of data A cached to execute task A may be stored into a place where set of data B cached to execute task B is stored. When this occurs, set of data B is overwritten with set of data A and erased.

Data which is to be accessed to execute task B is unlikely to be contained in set of data A. Therefore, overwriting set of data B with set of data A increases the possibility that the hit rate of task B will drop.

SUMMARY OF THE INVENTION

In view of the above problems, the present invention aims to provide a cache controller and a cache control method that eliminates the possibility of the hit rate of one task dropping due to execution of another task, in a computer system that concurrently executes a plurality of tasks in time-sharing or in parallel.

The stated aim can be achieved by a cache controller used in a computer system that includes a cache memory, a main memory, and a microprocessor which concurrently executes a plurality of tasks, including: a region managing unit operable to manage a plurality of regions in the cache memory in correspondence with the plurality of tasks; an address receiving unit operable to receive, from the microprocessor, an address of a location in the main memory at which data to be accessed to execute one of the plurality of tasks is stored; and a caching unit operable to acquire, if the data to be accessed is not stored in the cache memory, a data block including the data from the main memory, and store the acquired data block into a region in the cache memory corresponding to the task.

According to this construction, a set of data cached for a first task is stored in a region corresponding to the first task, and a set of data cached for a second task is stored in a region corresponding to the second task. This solves the problem of the conventional cache control methods that the set of data cached for the first task is overwritten with the set of data cached for the second task. Hence the possibility of the hit rate of the first task dropping due to execution of the second task can be eliminated.

Here, the region managing unit may divide the cache memory into the plurality of regions equal in number to the plurality of tasks, and manage the plurality of regions in a one-to-one correspondence with the plurality of tasks.

According to this construction, the cache memory is divided into the same number of regions as the tasks concurrently executed by the microprocessor, and the divided regions are managed in a one-to-one correspondence with the tasks.

Here, the region managing unit may receive information about how many tasks are concurrently executed by the microprocessor and a size of memory required for execution of each of the plurality of tasks, and divide the cache memory into the plurality of regions based on the received information.

According to this construction, a necessary amount of memory is secured for each individual task. This makes it possible, for example, to assign a small region to a task which does not require high-speed access and a large region to a task which requires high-speed access.

Here, the cache controller may further include: a task ID receiving unit operable to receive a task ID of the task, wherein the region managing unit manages the plurality of regions in a one-to-one correspondence with task IDs of the plurality of tasks, and the caching unit stores the acquired data block into the region in the cache memory corresponding to the received task ID.

These task IDs can be issued by the microprocessor or other hardware that manages the tasks.

Here, the task ID may be an address of a location in the main memory at which the task is stored as a program.

Here, the task ID may be generated by converting an address of a location in the main memory at which the task is stored as a program.

Here, the microprocessor may perform multitasking under control of an operating system, wherein the task ID is a process ID assigned by the operating system.

Here, the cache controller may further include: a judging unit operable to judge whether the data is stored in the cache memory, by searching all of the plurality of regions.

Here, the cache controller may further include: a judging unit operable to judge whether the data is stored in the cache memory, by searching the region corresponding to the task.

According to this construction, the data in the cache memory can be detected quickly.

Here, the cache memory may be made up of a plurality of ways, wherein the plurality of regions each contain at least one way.

Here, the cache controller may use set associative mapping for each region containing more than one way.

Here, the region managing unit may divide the cache memory into a specific region and a nonspecific region, and manage the specific region in correspondence with a specific task out of the plurality of tasks, wherein the caching unit stores the acquired data block into the specific region if the task is the specific task, and into the nonspecific region if the task is other than the specific task.

For instance, an application program with a real-time guarantee requirement is managed in correspondence with the specific region as the specific task. This prevents a set of data cached for the specific task from being overwritten with a set of data cached for another task. Hence the possibility of the hit rate of the specific task dropping due to execution of another task is eliminated, with it being possible to guarantee real-time processing.

Here, the microprocessor may concurrently execute a first task, a second task, and a third task, wherein the region managing unit divides the cache memory into a first region and a second region, and manages the first region in correspondence with the first task and the second task, and the second region in correspondence with the third task, and the caching unit stores the acquired data block into the first region if the task is the first task or the second task, and into the second region if the task is the third task.

According to this construction, when the access patterns of the first and second tasks have common locality, the hit rates of these tasks can be improved.

The stated aim can also be achieved by a cache control method used in a computer system that includes a cache memory, a main memory, and a microprocessor which concurrently executes a plurality of tasks, including: a region managing step of managing a plurality of regions in the cache memory in correspondence with the plurality of tasks; an address receiving step of receiving, from the microprocessor, an address of a location in the main memory at which data to be accessed to execute one of the plurality of tasks is stored; and a caching step of acquiring, if the data to be accessed is not stored in the cache memory, a data block including the data from the main memory, and storing the acquired data block into a region in the cache memory corresponding to the task.

The stated aim can also be achieved by a computer system including a cache memory, a cache controller, a main memory, and a microprocessor which concurrently executes a plurality of tasks, the cache controller including: a region managing unit operable to manage a plurality of regions in the cache memory in correspondence with the plurality of tasks; an address receiving unit operable to receive, from the microprocessor, an address of a location in the main memory at which data to be accessed to execute one of the plurality of tasks is stored; and a caching unit operable to acquire, if the data to be accessed is not stored in the cache memory, a data block including the data from the main memory, and store the acquired data block into a region in the cache memory corresponding to the task.

Here, the computer system may further include: an address converting unit operable to receive from the microprocessor a logical address showing the address of the location in the main memory at which the data to be accessed is stored, convert the logical address to a physical address, and send the physical address to the address receiving unit, wherein the cache controller further includes: a data block managing unit operable to manage the data block stored in the cache memory by the caching unit, using the physical address.

Here, the address receiving unit may receive from the microprocessor a logical address showing the address of the location in the main memory at which the data to be accessed is stored, wherein the cache controller further includes: a data block managing unit operable to manage the data block stored in the cache memory by the caching unit, using the logical address, and the computer system further includes: an address converting unit operable to convert the logical address output from the cache controller to a physical address, and send the physical address to the main memory.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 shows a cache memory divided into a specific region and a nonspecific region; and FIG. 8 shows a cache memory which has at least one way in each region.

DESCRIPTION OF THE PREFERRED EMBODIMENT

The following describes a cache controller that is one embodiment of the present invention, with reference to the drawings.

(Construction of a Computer System)

Figure 1:
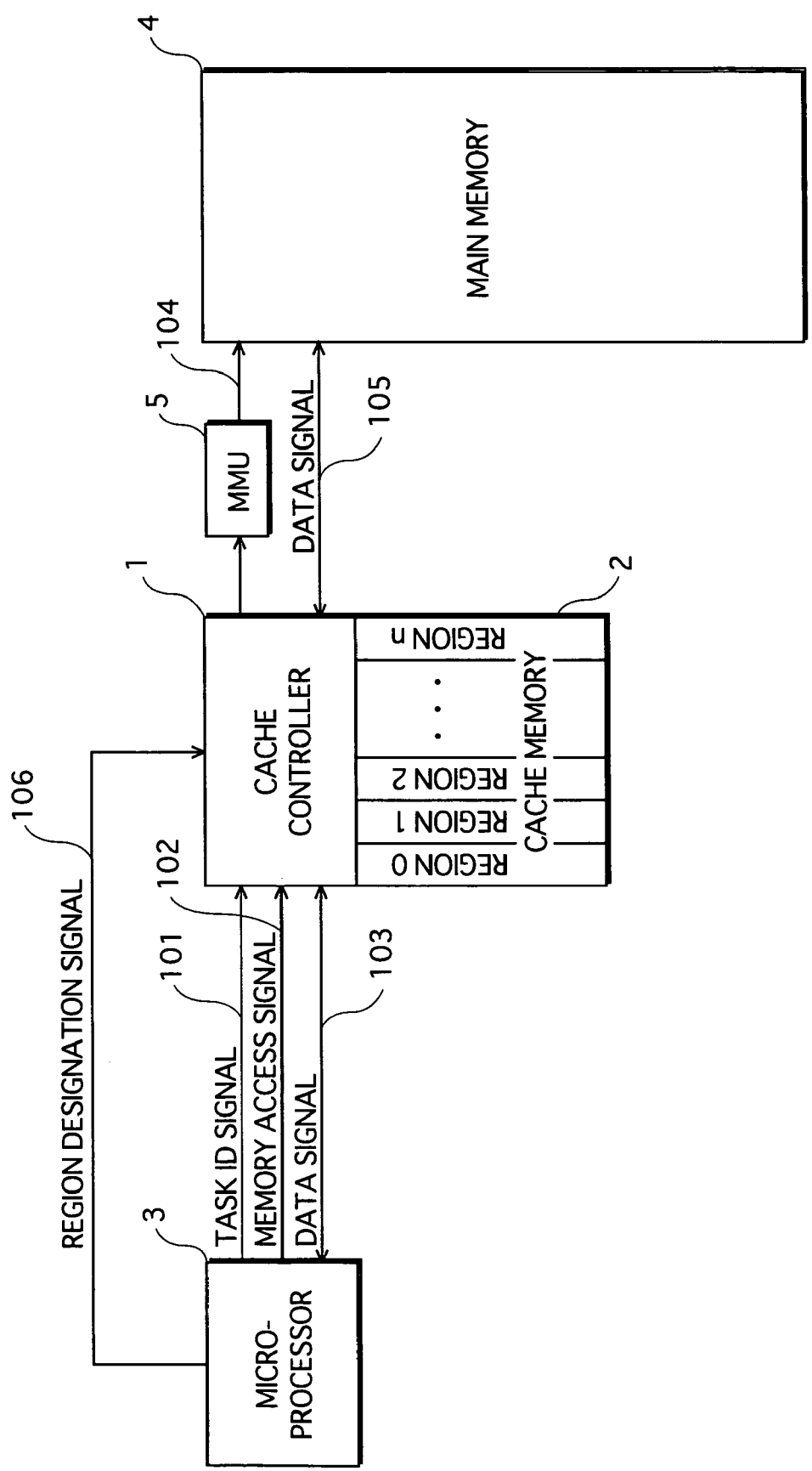
FIG. 1 shows a construction of a computer system that includes a cache controller according to an embodiment of the invention.

FIG. 1 shows a construction of a computer system that includes the cache controller of this embodiment.

This computer system includes a cache controller 1, a cache memory 2, a microprocessor 3, a main memory 4, a MMU (memory management unit) 5, and a hard disk (not illustrated). Components which are not particularly relevant to the features of the present invention are not shown in the drawings and their explanation has been omitted.

The microprocessor 3 executes programs and performs various operations. In detail, the microprocessor 3 performs multitasking, i.e. concurrent execution of a plurality of programs as tasks in a time-sharing manner, under control of an OS (operating system).

If execution switches from one task to another, the microprocessor 3 sends a task ID of the latter task to the cache controller 1 via a task ID signal line 101.

The task ID referred to here is generated by converting a logical address showing a main memory address at which a program executed as the task is stored.

The microprocessor 3 also sends a logical address showing a main memory address which is to be accessed, to the cache controller 1 via a memory access signal line 102. If the access is a read, the microprocessor 3 receives data at the main memory address, from the cache controller 1 via a data signal line 103.

Also, when executing a system management program for the OS or the like, the microprocessor 3 sends region designation information that includes the number of tasks to be executed, a task ID of each task, and a necessary cache memory size of each task, to the cache controller 1 via a region designation signal line 106.

The cache controller 1 controls data access to the cache memory 2. The cache controller 1 has the following feature that is distinct from conventional cache controllers. The cache controller 1 manages regions of the cache memory 2 in a one-to-one correspondence with the tasks executed by the microprocessor 3 in multitasking, and stores a set of data cached in units of lines for one task into a region in the cache memory 2 corresponding to that task.

A functional construction of the cache controller 1 that achieves this feature is explained in detail later.

The cache memory 2 is a storage device that can be accessed faster than the main memory 4. The cache memory 2 is an SRAM (static random access memory) as one example.

The MMU 5 converts a logical address showing a main memory address sent from the cache controller 1 via a memory access signal line 104, to a physical address.

The main memory 4 is a storage device which has a lower access speed than the cache memory 2. The main memory 4 is a DRAM (dynamic random access memory) as one example. The main memory 4 is equipped with a memory controller for controlling data access to the main memory 4.

Upon receiving a main memory address (physical address) from the cache controller 1 via the memory access signal line 104, the memory controller reads a set of data stored at consecutive addresses including the received address from the main memory 4, and sends the set of data to the cache controller 1 via a data signal line 105.

(Construction of the Cache Controller 1)

A construction of the cache controller 1 is explained in detail below.

Figure 2:
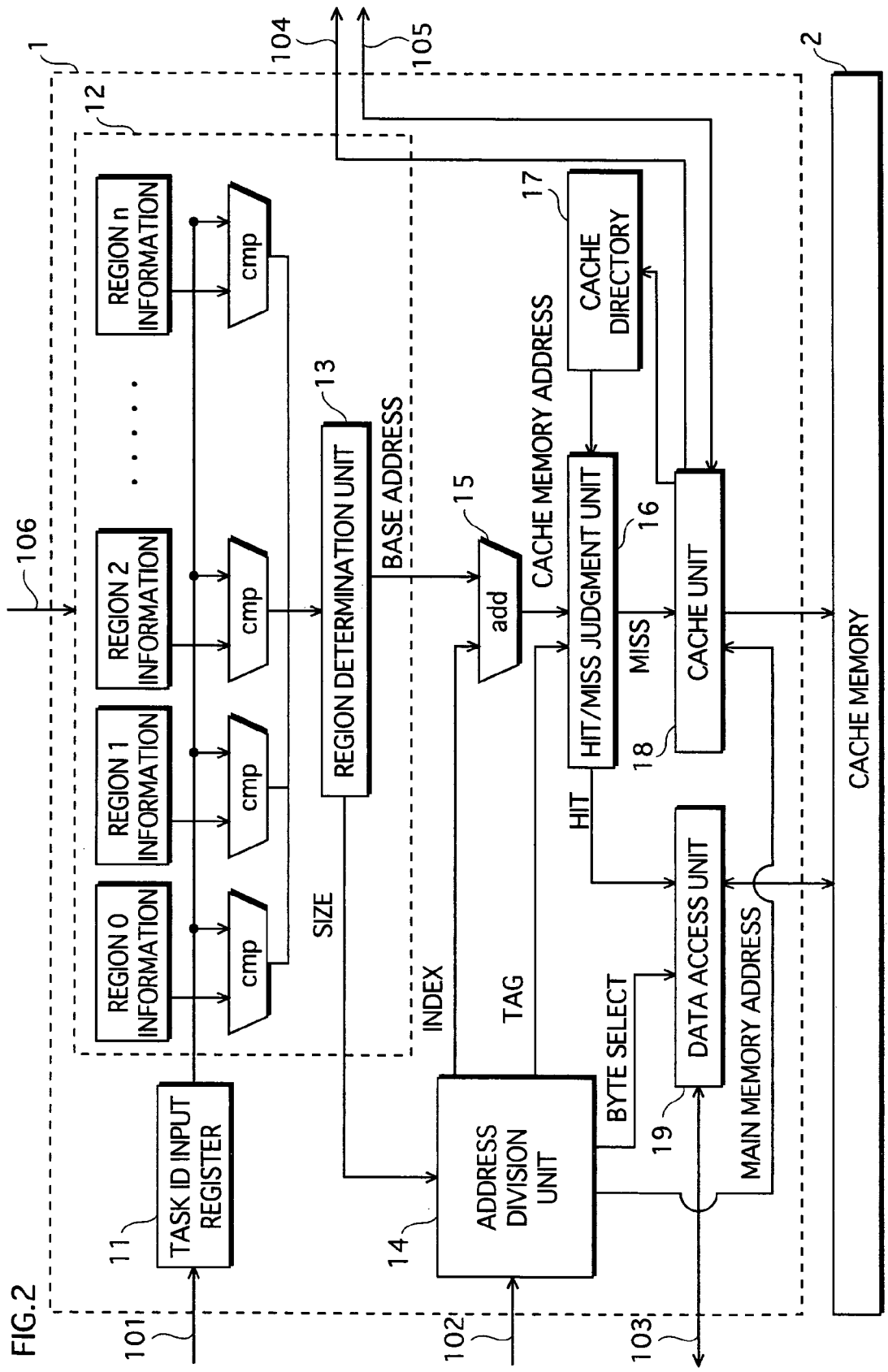
FIG. 2 shows a construction of the cache controller shown in FIG. 1.

FIG. 2 shows a functional construction of the cache controller 1.

The cache controller 1 includes a task ID input register 11, a region management unit 12, an address division unit 14, a cache memory address generation unit 15, a hit/miss judgment unit 16, a cache directory 17, a cache unit 18, and a data access unit 19. The region management unit 12 includes a region determination unit 13.

The region management unit 12 divides the cache memory 2 into regions based on region designation information sent from the microprocessor 3 via the region designation signal line 106. Having done so, the region management unit 12 manages the regions in a one-to-one correspondence with task IDs.

Region information shown in FIG. 2 includes a task ID of a corresponding task executed by the microprocessor 3.

The task ID input register 11 receives a task ID from the microprocessor 3 via the task ID signal line 101, and passes it to the region management unit 12.

Upon receiving the task ID from the task ID input register 11, the region management unit 12 compares the received task ID with each task ID included in region information using comparators (cmp). If the received task ID matches a task ID included in any region information, a comparator corresponding to that region information outputs a region number of the region to the region determination unit 13.

The region determination unit 13 generates and holds a region management table based on the region designation information sent from the microprocessor 3 via the region designation signal line 106, in advance.

Figure 3:
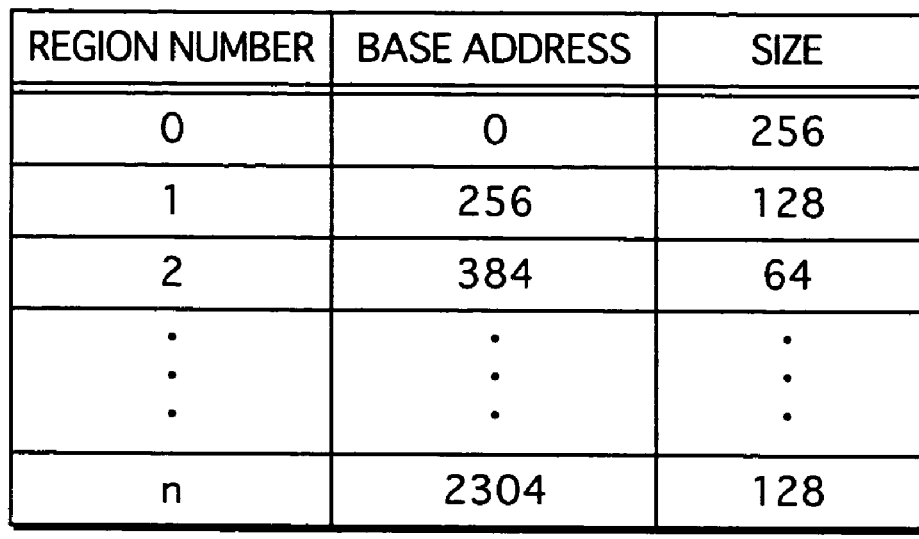
FIG. 3 shows one specific example of a region management table.

FIG. 3 shows one specific example of the region management table.

In the drawing, a region management table 20 shows a correspondence between region numbers, base addresses, and sizes.

A region number is a number for identifying a region.

A base address is a cache memory address of a beginning location of a region.

A size shows a capacity of a region. The value "1" is equivalent to one line.

In this embodiment, one line is 16 bytes, and one main memory address stores 1-byte data.

Upon receipt of the region number, the region determination unit 13 refers to the region management table, and outputs a base address and size corresponding to the region number respectively to the cache memory address generation unit 15 and the address division unit 14.

The address division unit 14 receives a main memory address (logical address) from the microprocessor 3 via the memory access signal line 102, and divides the main memory address (logical address) into three fields. These three fields are hereafter called a tag, an index, and a byte select.

Figure 4:
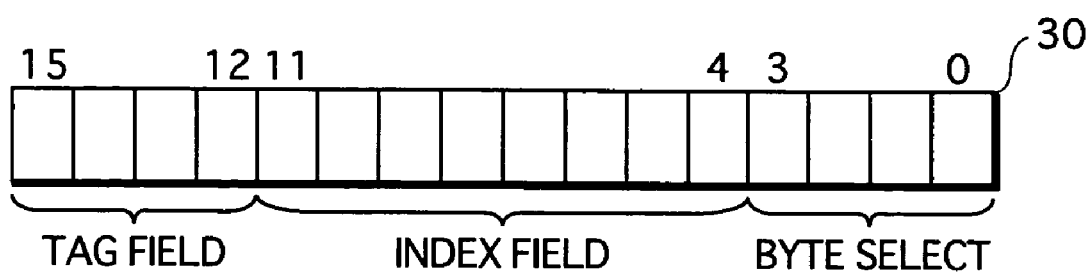
FIG. 4 shows three fields when dividing a 16-bit main memory address.

FIG. 4 shows three fields when dividing a 16-bit main memory address (logical address) 30.

The tag is used to judge whether a set of data stored at a cache memory address generated by the cache memory address generation unit 15 contains data requested by the microprocessor 3.

The index is used to generate the cache memory address.

The byte select is used to select the requested data from the set of data stored in units of lines.

In this embodiment, one line is made up of sixteen pieces of 1-byte data. Accordingly, the lower-order 4 bits of the main memory address (logical address) is used as the byte select.

Meanwhile, the field sizes of the tag and the index vary depending on the size of the region notified by the region determination unit 13.

Suppose the size of the region is 256 lines (256×16 bytes=4096 bytes). In this case, the higher-order 4 bits of the main memory address (logical address) are used as the tag, and the next 8 bits are used as the index. These 8 bits of the index express one of the 256 lines of the region.

Suppose the size of the region is 128 lines. In this case, the higher-order 5 bits of the main memory address are used as the tag, and the next 7 bits are used as the index. These 7 bits of the index express one of the 128 lines of the region.

The address division unit 14 sends the index to the cache memory address generation unit 15, the tag to the hit/miss judgment unit 16, and the byte select to the data access unit 19.

The cache memory address generation unit 15 adds the base address received from the region determination unit 13 and the index received from the address division unit 14, to generate the cache memory address in the cache memory 2 which stores data in units of lines. The cache memory address generation unit 15 sends the cache memory address to the hit/miss judgment unit 16.

The hit/miss judgment unit 16 checks whether the tag received from the address division unit 14 is held in the cache directory 17 in correspondence with the cache memory address received from the cache memory address generation unit 15, to judge a cache hit or a cache miss. The cache directory 17 is a table which associates cache memory addresses with tags.

On a cache hit, the hit/miss judgment unit 16 sends the cache memory address to the data access unit 19.

On a cache miss, the hit/miss judgment unit 16 sends the cache memory address and the tag to the cache unit 18.

The cache unit 18 sends the main memory address (logical address) received by the address division unit 14 to the MMU 5 via the memory access signal line 104, if the hit/miss judgment unit 16 judges a cache miss. The MMU 5 converts the logical address to a physical address, and sends it to the main memory 4.

The cache unit 18 then acquires a set of data in units of lines from the main memory 4 via the data signal line 105, and stores the set of data in the cache memory 2 at the cache memory address received from the hit/miss judgment unit 16. The cache unit 18 also writes the tag and the cache memory address in the cache directory 17 in correspondence with each other.

The data access unit 19 receives the cache memory address from the hit/miss judgment unit 16 and the byte select from the address division unit 14. The data access unit 19 selects the requested data from the set of data stored at the cache memory address using the byte select, and performs a write or a read.

In the case of a read, the data access unit 19 reads the data and sends it to the microprocessor 3 via the data signal line 103.

(Operation)

A cache control procedure of the cache controller 1 in response to a read access from the microprocessor 3 is explained below.

Figure 5:
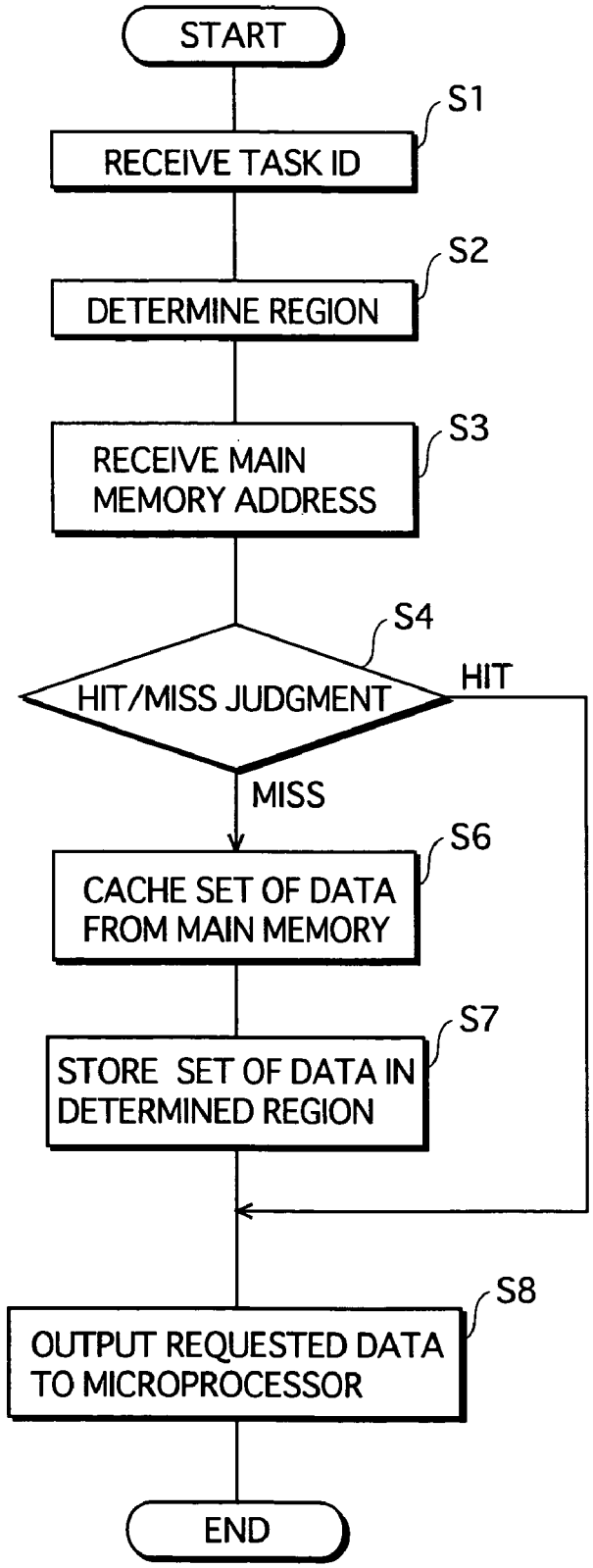
FIG. 5 is a flowchart showing a cache control procedure of the cache controller.

FIG. 5 is a flowchart showing the cache control procedure of the cache controller 1 in response to a read access from the microprocessor 3.

The task ID input register 11 receives a task ID from the microprocessor 3 (S1), and passes it to the region management unit 12.

The region management unit 12 compares the task ID with each task ID in region information using comparators, and sends a region number to the region determination unit 13.

The region determination unit 13 receives the region number, and determines a region with reference to the region management table (S2). The region determination unit 13 sends a base address and size corresponding to the region number, respectively to the cache memory address generation unit 15 and the address division unit 14.

The address division unit 14 receives a main memory address from the microprocessor 3 (S3), and divides it into a tag, an index, and a byte select. The address division unit 14 sends the tag, the index, and the byte select respectively to the hit/miss judgment unit 16, the cache memory address generation unit 15, and the data access unit 19.

The cache memory address generation unit 15 adds the index and the base address to generate a cache memory address. The cache memory address generation unit 15 sends the cache memory address to the hit/miss judgment unit 16.

The hit/miss judgment unit 16 judges whether the tag is held in the cache directory 17 in correspondence with the cache memory address (S4).

If so, i.e. a cache hit (S4:HIT), the procedure advances to step S8.

Otherwise, i.e. a cache miss (S4:MISS), the cache unit 18 caches a set of data from the main memory 4 (S6), and stores the set of data in the cache memory address (S7). The cache unit 18 also writes the cache memory address and the tag to the cache directory 17 in correspondence with each other.

The data access unit 19 sends requested data to the microprocessor 3 (S8), to complete the cache control procedure.

A cache control procedure in response to a write access is similar to the above cache control procedure in response to a read access, and differs only in that write data sent from the microprocessor 3 is written to the cache memory 2 instead of reading data from the cache memory 2.

EXAMPLE MODIFICATION

An example modification to the above embodiment is given below.

The cache controller 1 of the above embodiment receives region designation information from the microprocessor 3 via the region designation signal line 106. Based on the region designation information, the cache controller 1 divides the cache memory 2 into the same number of regions as tasks that are concurrently executed by the microprocessor 3, and manages the regions in correspondence with task IDs of the tasks. This can be modified as follows. The cache controller 1 receives region designation information including a task ID and necessary cache memory size of a specific task from the microprocessor 3, divides the cache memory 2 into a specific region and a nonspecific region based on the region designation information, and manages the specific region in correspondence with the task ID of the specific task.

FIG. 7 shows a cache memory 2A divided into a specific region and a nonspecific region.

In this example modification, the region management unit 12 shown in FIG. 2 holds only region information of the specific region. This region information includes a task ID of a specific task. Also, only one comparator is provided to compare a task ID received from the task ID input register 11 with the task ID shown by the region information. The other components are the same as those in the above embodiment.

Figure 6:
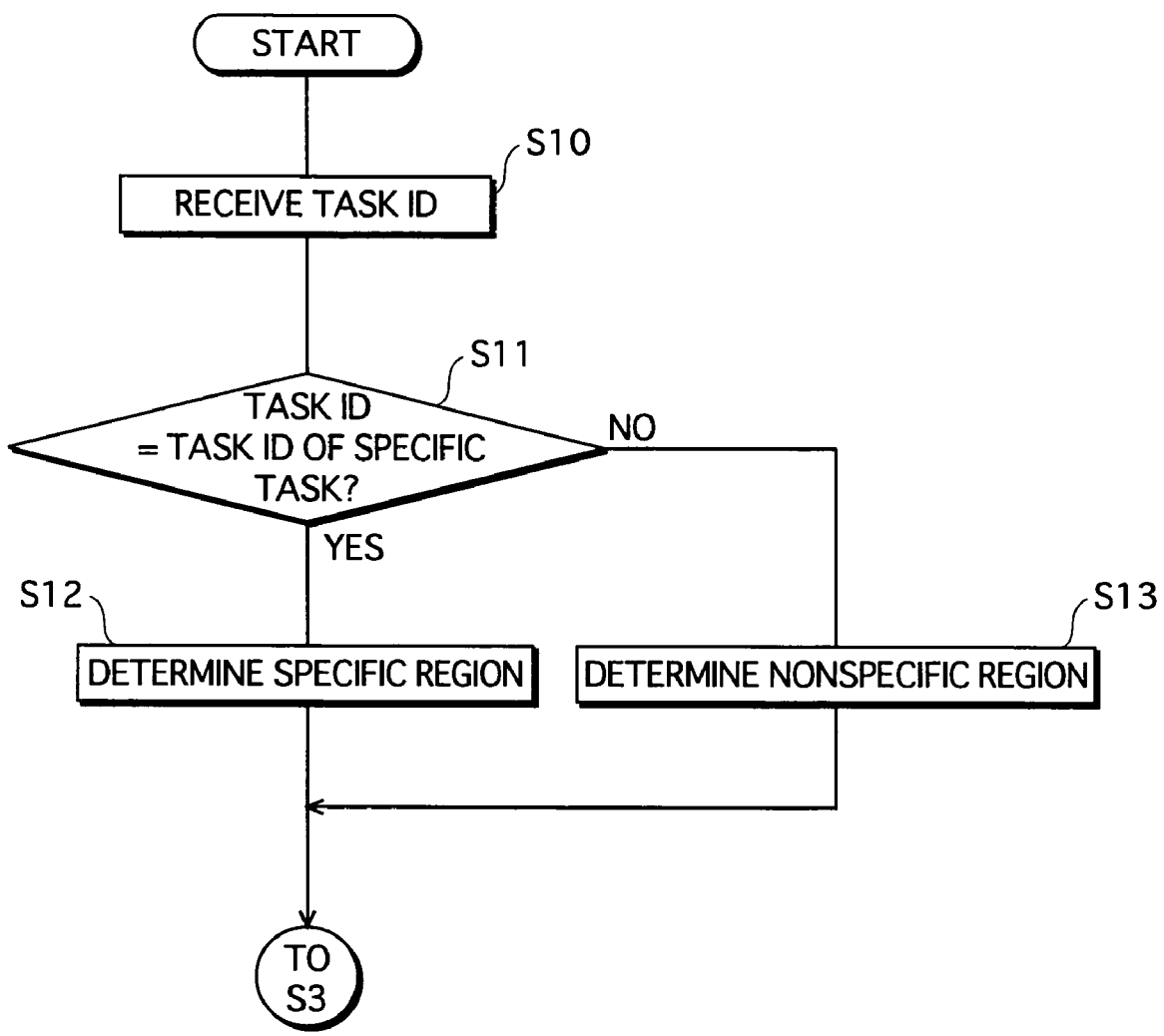
FIG. 6 is a flowchart showing a modification to the cache control procedure.

FIG. 6 is a flowchart showing a cache control procedure of the cache controller 1 in this example modification.

The task ID input register 11 receives a task ID from the microprocessor 3 (S10), and passes it to the region management unit 12.

The region management unit 12 compares the task ID with a task ID in region information using a comparator. If they match (S11:YES), the region management unit 12 outputs a region number of a specific region to the region determination unit 13, before advancing to step S3 in FIG. 5. If they do not match (S11:NO), the region management unit 12 sends a region number of a nonspecific region to the region determination unit 13, before advancing to step S3. Subsequent processes are the same as those in the above embodiment.

For instance, an application program having a real-time guarantee requirement is set as the specific task (program).

The real-time guarantee requirement means a requirement to guarantee that a predetermined process completes within a predetermined time. Examples of such an application program include a media application program for playback/recording of stream data such as video and audio.

Such an application program having a real-time guarantee requirement includes flag information indicating the requirement and a necessary cache memory size. This being so, when executing this application program as one task concurrently with a plurality of tasks, the microprocessor 3 judges that the application program is the specific task based on the flag information, and notifies this to the cache controller 1.

(Other Modifications)

The cache controller of the present invention has been described by way of the above embodiment and the example modification, though it should be obvious that the present invention is not limited to such. Other modifications are given below.

(1) The cache memory 2 may be made up of a plurality of ways. A way is a physically or logically independent memory unit.

In this case, the region management table 20 in FIG. 3 that shows a correspondence between region numbers, base addresses, and sizes can be omitted. Instead, the cache controller 1 manages ways and task IDs in correspondence with each other, using way numbers instead of region numbers.

FIG. 8 shows a cache memory 2B which includes at least one way in each region.

Here, set associative mapping may be employed for each region having more than one way.

(2) The above embodiment describes the case where the cache controller 1 sets the correspondence between regions and tasks and the size of each region based on region designation information received from the microprocessor 3. However, the cache controller 1 may instead use region designation information received from another external device, such as hardware that performs task management.

(3) The cache controller 1 may dynamically generate and delete regions based on region designation information received from the microprocessor 3 or another external device.

(4) The above embodiment describes the case where the cache controller 1 receives a task ID from the microprocessor 3 and determines a region. As an alternative, the cache controller 1 may receive a processor ID from the microprocessor 3 or one of a plurality of processors and determine a region. Also, the cache controller 1 may receive both a task ID and a processor ID and determine a region.

(5) The above embodiment describes the case where regions and tasks have a one-to-one correspondence with each other. However, if the probability of two or more tasks accessing to data in the same main memory address is high, these tasks may be associated with one region.

Suppose the microprocessor 3 concurrently executes tasks A, B, and C. Based on region designation information given from the microprocessor 3, the region management unit 12 divides the cache memory 2 into two regions, and associates the first region with a task ID of task A and a task ID of task B and the second region with a task ID of task C. If a cache miss occurs during execution of task A or B, the cache unit 18 stores a cached set of data to the first region. If a cache miss occurs during execution of task C, the cache unit 18 stores a cached set of data to the second region.

(6) The above embodiment describes the case where the hit/miss judgment unit 16 makes a judgment by referring to all cache memory addresses held in the cache directory 17. As an alternative, the hit/miss judgment unit 16 may refer to only cache memory addresses of a determined region in the cache directory 17.

(7) The above embodiment describes the case where the MMU 5 is situated between the cache controller 1 and the main memory 4. Alternatively, the MMU 5 may be situated between the microprocessor 3 and the cache controller 1. This enables the cache controller 1 to manage cached data based on physical addresses of the main memory 4 generated by the MMU 5.

(8) If the same application program operates as a plurality of different tasks, the cache controller 1 may receive a task discrimination signal from the OS or hardware that performs task management, to identify a task.

(9) A task ID transferred from the microprocessor 3 to the cache controller 1 via the task ID signal line 101 may be a logical address showing a main memory address in which a program executed as a task is stored, or a program counter value.

(10) The above embodiment describes the case where the cache controller 1 and the cache memory 2 are separate devices, but this is not a limit for the invention. The cache controller 1 and the cache memory 2 may be realized as a single device. Also, the cache controller 1, the cache memory 2, and the microprocessor 3 may be realized as a single device.

(11) The above embodiment and example modification describe a computer system which concurrently executes a plurality of tasks in time-sharing. However, the present invention is equally applicable to a computer system in which a plurality of microprocessors or a multiprocessor capable of parallel execution of a plurality of tasks concurrently perform a plurality of tasks in parallel using the shared cache memory 2.

(12) The above embodiment and example modification can be modified in the following way. Prior to concurrent execution of a plurality of tasks, a judgment is made on whether the microprocessor 3 has a sufficient throughput for guaranteeing real-time processing. If the judgment is in the negative, the cache controller 1 is set to perform the above cache control procedure.

Here, an application program having a real-time guarantee requirement may contain a test program to make such a judgment.

(13) The above example modification describes the case where an application program having a real-time guarantee requirement contains flag information indicating such a requirement. This flag information may include a requirement level showing to what degree real-time processing needs to be guaranteed.

If a sufficient region cannot be assigned to a task of an application program having flag information with a high requirement level, the cache controller 1 may dynamically reduce the size of a region assigned to another task and assign it to the task of the application program.

(14) The above example modification can be modified as follows. Suppose an application program displays a window on a display screen over a window which is displayed by another application program. In this case, the former application program is set as an application program having a real-time guarantee requirement. As an alternative, the OS manages an operation history of each application program executed as a task. This being so, an application program that has a high frequency of being active is set as an application program having a real-time guarantee requirement.

(15) The present invention also applies to the cache control method used by the cache controller 1 described above. This method may be realized by a control program. Such a control program may be distributed as a digital signal.

(16) The present invention may be realized by a computer-readable storage medium, such as a flexible disk, a hard disk, a CD-ROM, an MO, a DVD, a DVD-ROM, a DVD-RAM, a BD (blu-ray disc), or a semiconductor memory, on which a control program or digital signal mentioned above is recorded.

(17) A control program or digital signal that achieves the present invention may also be transmitted via a network, such as an electronic communications network, a wired or wireless communications network, or the Internet.

(18) A control program or digital signal that achieves the present invention may be provided to an independent computer system by distributing a storage medium on which the control program or digital signal is recorded, or by transmitting the control program or digital signal via a network. The independent computer system may then execute the control program or digital signal to function as the present invention.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A cache controller used in a computer system that includes a cache memory, a main memory, and a microprocessor which concurrently executes a plurality of tasks, comprising:
    a region managing unit operable to manage a plurality of regions in the cache memory in correspondence with the plurality of tasks;
    an address receiving unit operable to receive, from the microprocessor, an address of a location in the main memory at which data to be accessed to execute one of the plurality of tasks is stored;
    a judging unit operable to judge whether the data stored at the received address is stored in the cache memory, by searching all data in all of the plurality of regions in the cache memory; and
    a caching unit operable to acquire, if the judging unit judges that the data is not stored in the cache memory, a data block including the data from the main memory, and store the acquired data block into a region in the cache memory corresponding to the task.

2. The cache controller of claim 1,
    wherein the region managing unit divides the cache memory into the plurality of regions equal in number to the plurality of tasks, and manages the plurality of regions in a one-to-one correspondence with the plurality of tasks.

3. The cache controller of claim 2,
    wherein the region managing unit receives information about how many tasks are concurrently executed by the microprocessor and a size of memory required for execution of each of the plurality of tasks, and divides the cache memory into the plurality of regions based on the received information.

4. The cache controller of claim 3, further comprising:
    a task ID receiving unit operable to receive a task ID of the task,
    wherein the region managing unit manages the plurality of regions in a one-to-one correspondence with task IDs of the plurality of tasks, and
    the caching unit stores the acquired data block into the region in the cache memory corresponding to the received task ID.

5. The cache controller of claim 4,
    wherein the task ID is an address of a location in the main memory at which the task is stored as a program.

6. The cache controller of claim 4,
    wherein the task ID is generated by converting an address of a location in the main memory at which the task is stored as a program.

7. The cache controller of claim 4,
    wherein the microprocessor performs multitasking under control of an operating system, and
    the task ID is a process ID assigned by the operating system.

8. The cache controller of claim 4,
    wherein the cache memory is made up of a plurality of ways, and
    the plurality of regions each contain at least one way.

9. The cache controller of claim 1,
    wherein the region managing unit divides the cache memory into a specific region and a nonspecific region, and manages the specific region in correspondence with a specific task out of the plurality of tasks, and
    the caching unit stores the acquired data block into the specific region if the task is the specific task, and into the nonspecific region if the task is other than the specific task.

10. The cache controller of claim 1,
    wherein the microprocessor concurrently executes a first task, a second task, and a third task,
    the region managing unit divides the cache memory into a first region and a second region, and manages the first region in correspondence with the first task and the second task, and the second region in correspondence with the third task, and
    the caching unit stores the acquired data block into the first region if the task is the first task or the second task, and into the second region if the task is the third task.

11. A cache control method used in a computer system that includes a cache memory, a main memory, and a microprocessor which concurrently executes a plurality of tasks, comprising:
- a region managing step of managing a plurality of regions in the cache memory in correspondence with the plurality of tasks;
- an address receiving step of receiving, from the microprocessor, an address of a location in the main memory at which data to be accessed to execute one of the plurality of tasks is stored;
- a judging step of judging whether the data stored at the received address is stored in the cache memory, by searching all data in all of the plurality of regions in the cache memory; and
- a caching step of acquiring, if the data is not stored in the cache memory, a data block including the data from the main memory, and storing the acquired data block into a region in the cache memory corresponding to the task.

12. A computer system comprising a cache memory, a cache controller, a main memory, and a microprocessor which concurrently executes a plurality of tasks, the cache controller including:
- a region managing unit operable to manage a plurality of regions in the cache memory in correspondence with the plurality of tasks;
- an address receiving unit operable to receive, from the microprocessor, an address of a location in the main memory at which data to be accessed to execute one of the plurality of tasks is stored;
- a judging unit operable to judge whether the data stored at the received address is stored in the cache memory, by searching all data in all of the plurality of regions in the cache memory; and
- a caching unit operable to acquire, if the judging unit judges that the data is not stored in the cache memory, a data block including the data from the main memory, and store the acquired data block into a region in the cache memory corresponding to the task.

13. The computer system of claim 12, further comprising:
an address converting unit operable to receive from the microprocessor a logical address showing the address of the location in the main memory at which the data to be accessed is stored, convert the logical address to a physical address, and send the physical address to the address receiving unit, wherein the cache controller further includes:
a data block managing unit operable to manage the data block stored in the cache memory by the caching unit, using the physical address.

14. The computer system of claim 12, wherein the address receiving unit receives from the microprocessor a logical address showing the address of the location in the main memory at which the data to be accessed is stored, the cache controller further includes:

a data block managing unit operable to manage the data block stored in the cache memory by the caching unit, using the logical address, and the computer system further comprises:

an address converting unit operable to convert the logical address output from the cache controller to a physical address, and send the physical address to the main memory.

\* \* \* \* \*